(12) United States Patent
Madden et al.

(10) Patent No.: US 7,493,827 B2
(45) Date of Patent: Feb. 24, 2009

(54) LOAD MEASUREMENT DEVICE

(75) Inventors: Richard Madden, Groton, MA (US); Daniel Joseph McCarthy, Cambridge, MA (US); Gary L. Thomas, Hingham, MA (US)

(73) Assignee: Oil States Industries, Inc., Arlington, TX (US)

( * ) Notice: Subject to any disclaimer, the term of this patent is extended or adjusted under 35 U.S.C. 154(b) by 402 days.

(21) Appl. No.: 11/240,683

(22) Filed: Sep. 30, 2005

(65) Prior Publication Data

US 2006/0037405 A1 Feb. 23, 2006

Related U.S. Application Data

(63) Continuation of application No. 10/848,525, filed on May 17, 2004, now abandoned, which is a continuation of application No. 10/138,272, filed on May 30, 2002, now Pat. No. 6,752,029, which is a continuation of application No. 09/842,564, filed on Apr. 26, 2001, now Pat. No. 6,422,089.

(51) Int. Cl.
*G01B 5/00* (2006.01)
(52) U.S. Cl. .................................................. 73/779
(58) Field of Classification Search .................. 73/779
See application file for complete search history.

(56) References Cited

U.S. PATENT DOCUMENTS

| | | | |
|---|---|---|---|
| 4,269,070 A | 5/1981 | Nelson et al. | 73/779 |
| RE32,746 E | 9/1988 | Nelson et al. | 73/779 |
| 5,165,286 A | 11/1992 | Hamamura et al. | 73/779 |
| 5,359,902 A | 11/1994 | Barger et al. | 73/862.626 |
| 6,305,229 B1 * | 10/2001 | Inoue | 73/779 |
| 6,422,089 B1 * | 7/2002 | Madden et al. | 73/779 |
| 6,668,621 B1 * | 12/2003 | Wright | 73/54.25 |
| 6,752,029 B2 * | 6/2004 | Madden et al. | 73/862.69 |

OTHER PUBLICATIONS

*Battling Wear on Chain Joints in Passive Deepwater Mooring Systems*, Tom Miller (Bardex Corporation) Offshore pp. 106 and 234, Apr. 2000.

* cited by examiner

*Primary Examiner*—Max Noori
(74) *Attorney, Agent, or Firm*—Richard C. Auchterlonie; Novak Druce & Quigg, LLP

(57) ABSTRACT

A variable reluctance load cell for measuring the static or slowly fluctuating load, or tension, on devices is contained in a support tube. A sensor in the tube utilizes opposing C and I shaped magnetic cores attached to opposing ends of the support tube. A magnetic circuit is formed having an inductance defined by the size of the gap between the magnetic cores with the reluctance dominated by the gap. The sensor inductance is coupled with a fixed, predetermined capacitance in a resonant LC circuit, and the resonant frequency is a function of the gap. The sensor is in a cavity within the tube, and the cavity is sealed in a manner that prevents water or other damaging agents from entering the sensor. In this manner, mounting the sensor and tube to a static device and measuring the AC voltage at the sensor, the amount of load, or stress can be determined.

3 Claims, 2 Drawing Sheets

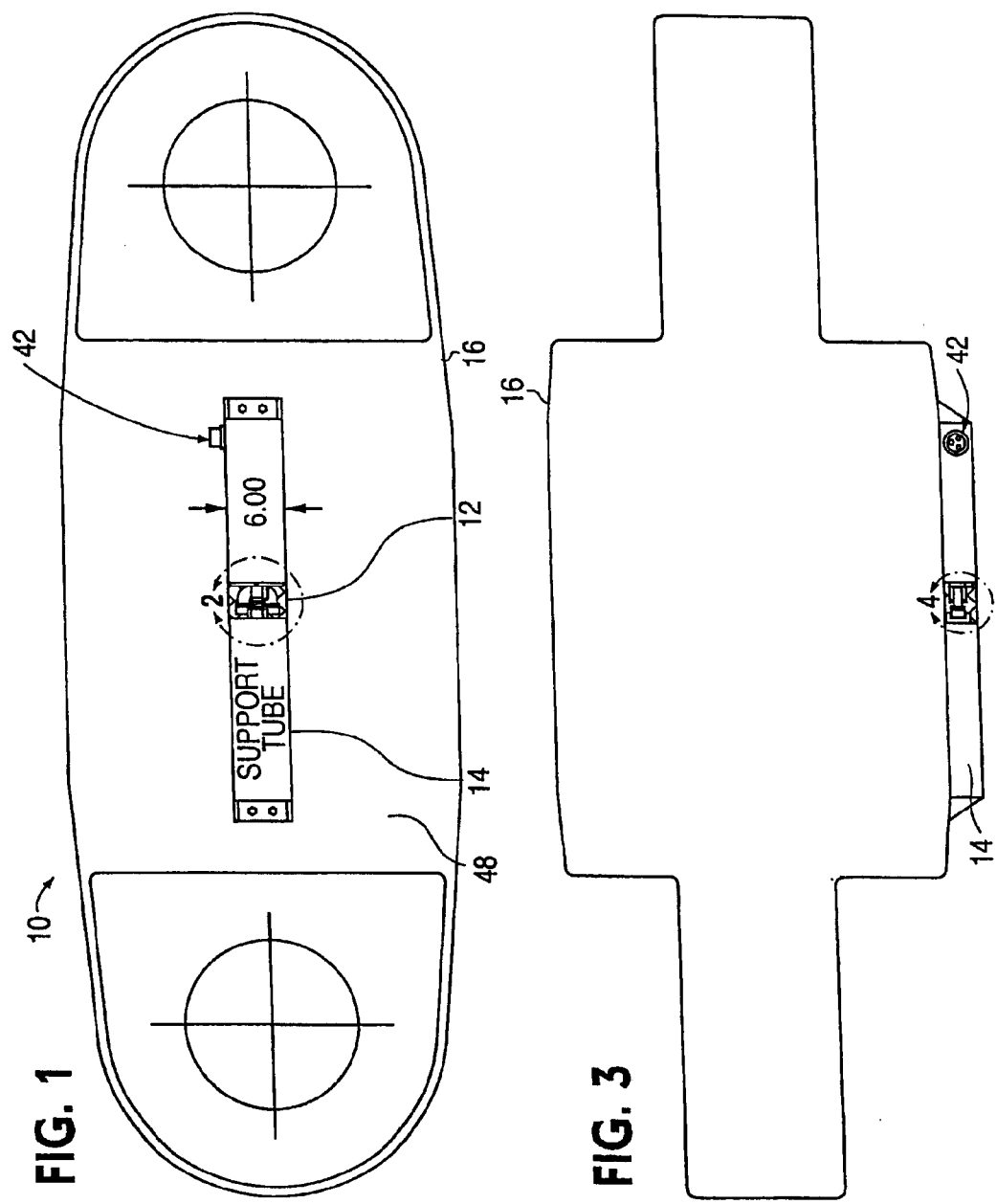

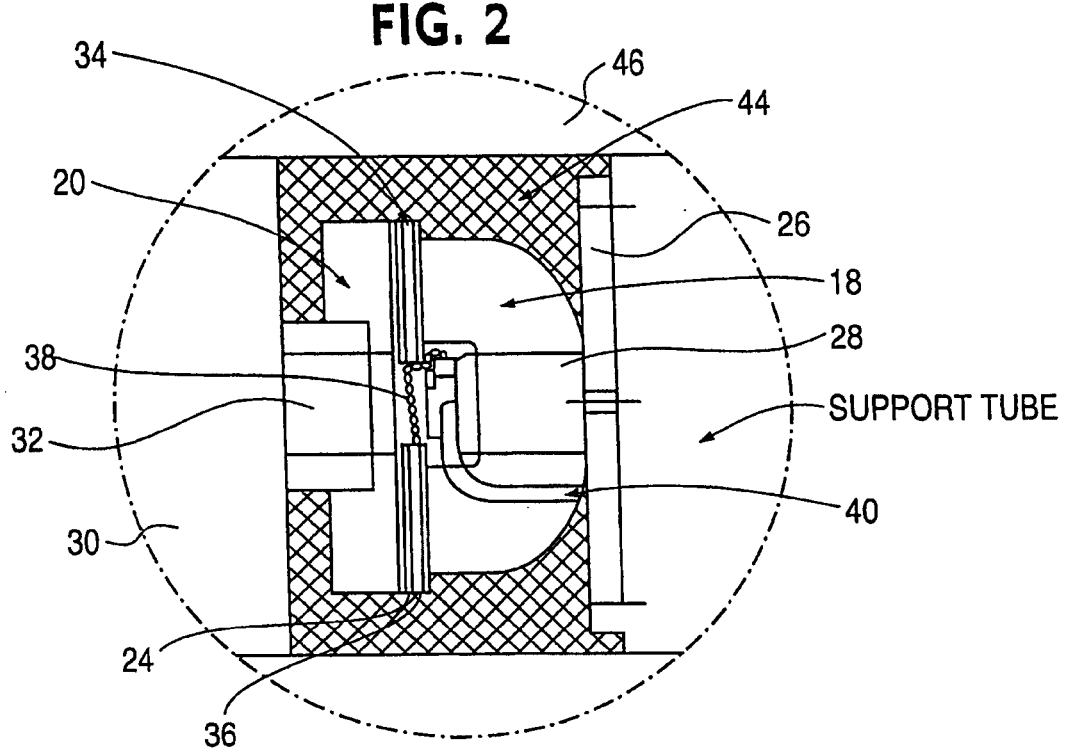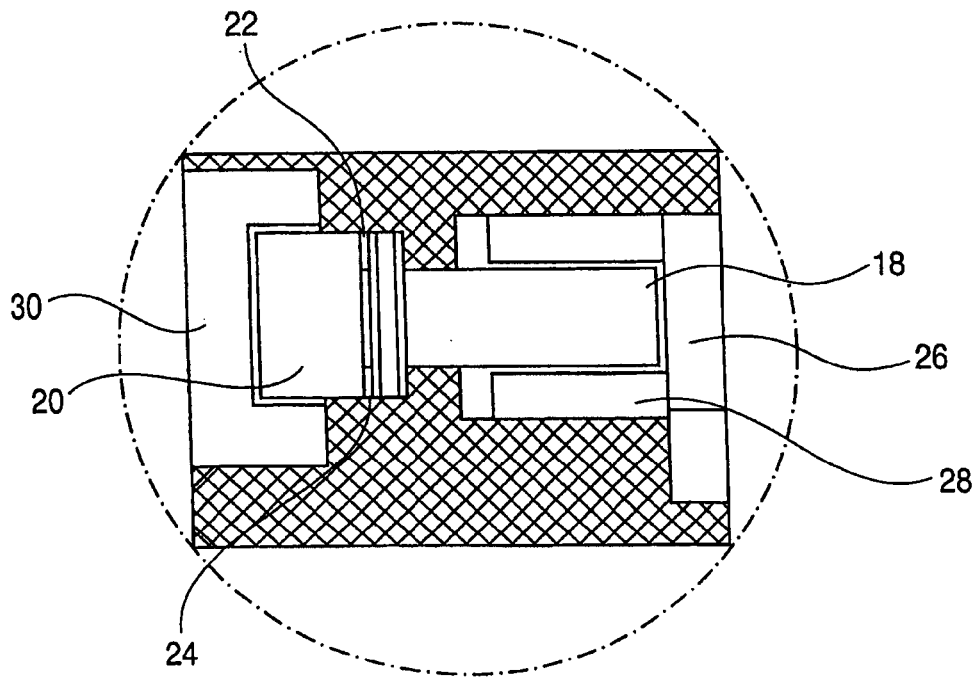

LOAD MEASUREMENT DEVICE

REFERENCE TO RELATED APPLICATIONS

This application is a continuation of U.S. patent application Ser. No. 10/848,525, filed on May 17, 2004 now abandoned, which is a continuation of U.S. patent application Ser. No. 10/138,272, filed on May 30, 2002 now U.S. Pat. No. 6,752,029, which is a continuation of U.S. patent application Ser. No. 09/842,564, filed on Apr. 26, 2001 now U.S. Pat. No. 6,422,089, the specifications of which are incorporated by reference herein in their entirety.

BACKGROUND OF THE INVENTION

1. Field of the Invention

The present invention relates to load cells for measuring static and slowly fluctuating load. More particularly, the present invention relates to a variable reluctance load cell for measuring the load, or tension, on static devices in an environmentally hostile environment (e.g., determining mooring line tensions of offshore oil platforms).

2. Description of the Related Art

Offshore deepwater platforms utilize various mooring systems for stationkeeping. A number of offshore platforms e.g. spars, deep draft caissons, semisubmersibles and floating production, storage and offloading vessels (FPSOs) are equipped with a means to jack the mooring chain and maintain tension on the line, reducing the amount of slack. Passively moored platforms or vessels that are not required to move may not be equipped with a permanently mounted tensioning system. As the mooring lines experience fatigue and stretch, the platform can twist, leading to increased friction between the links, and accelerating fatigue and failure. The amount of tension on the mooring line determines the amount of slack, and consequently the amount of relative movement of the platform or vessel.

Fairleads are used to attach the mooring chain to the deck of the platform or vessel. In one configuration, a chain stopper latches the chain outboard of the fairlead and allows the stopper to rotate freely about two perpendicular axis. All motion change between the mooring line and the vessel occurs on proper bearing surfaces, and not between the fairlead and the chain.

Tension in the vertical chain leg between the fairlead and the deck level stopper, combined with the rotation of the fairlead caused by yawing of the platform or vessel, promote undesirable wear in the chain links.

Similarly, suspension bridges rely on large cables to maintain support for the bridge span. The amount of tension on the suspension cables is indicative of the stress placed on the cables, and the amount and rate of cable wear and or fatigue.

Various devices are available to measure the amount of tension, or applied tensile force, placed on fasteners and securing lines, including strain gauge bridges, differential transformers, capacitance sensors and variable reluctance load cells.

Mooring line tensions have been measured with instrumented chain links that employ strain gauged shear pins, strain gauges and strain gauge load cells. Generally, these devices have not been reliable for long term applications in hostile environments, for example, marine and aerospace environments. Strain gauges require adhesive attachment to the surface being measured. In non-controllable environments, strain gauges are subject to drift caused, for example, by adhesive breakdown, requiring recalibration. In environmentally hostile environments, the frequency of recalibration, repair or replacements becomes expensive, and may even be dangerous to perform.

Variable reluctance load cells use a variable reluctance transducer to measure force. For example, a core and winding can be used to sense changes in proximity to a cantilevered spring. Changes in inductance, caused by changes in the gap between the core and the spring, are reflected in the frequency of an oscillator circuit. In a previous load cell sensor utilizing a variable reluctance transducer, the load cell sensor responded primarily to forces along a pre-selected axis, while being relatively insensitive to both forces along axis transverse to the pre-selected axis, and to bending moments. Accordingly, the load cell sensors were mounted in the middle of the structure under observation to compensate for bending forces. Additionally, the load cell sensor was internal to a load-measuring unit, and contained all the components. Intrusion of contaminants into the sensor region could lead to premature aging of the components, including corrosion, making the readings unreliable.

Accordingly, there is a need for a load measurement device that is less prone to the various effects of exposure to hostile environments and can take into account effects of bending.

SUMMARY OF THE INVENTION

This invention provides a variable reluctance sensor for measuring the load, or tension, on static devices in an environmentally hostile environment.

A sensor in accordance with the invention uses opposing magnetic cores contained in a support tube. Each of the magnetic cores is attached to opposing ends of the support tube. Thus, as the support tube expands along the tube axis, the ends of the support tube, which are perpendicular to the tube axis, separate. A magnetic circuit is formed having an inductance defined by the size of the gap between the magnetic cores. Accordingly, when the magnetic cores attached to the tube ends separate, the size of the gap between the magnetic cores is increased. Thus, when the inductance is altered, the amount of expansion that has occurred can be determined. Knowing the elastic characteristics of the support tube material, the amount of force applied to the support tube can be calculated. Similarly, contraction of the support tube results in a change in inductance that is indicative of the amount of stress reduction. Alternatively the support tube can have very little stiffness relative to the structure that it is mounted on so that no load passes through the support tube and it merely displaces the same amount as the structure displaces in the region between the attachment points. The combination is tested under known loads to provide the calibration.

Preferably, one of the magnetic cores is generally C-shaped, and attached to an end plate by way of a bracket. The end plate may be one of the tube ends, or another plate that is in turn attached to the support tube. The C-shape is preferred for one of the magnetic cores so that the windings can be placed at the ends of the C-shaped gaps. The other magnetic core is preferably I-shaped, and is attached to a second end plate by way of a second bracket. The second end plate, like the first end plate, may be the other tube end, or another plate that is in turn attached to the support tube. Thus, a cavity within the support tube containing the sensor is formed. Preferably, the cavity containing the sensor is sealed in a manner to prevent water or other damaging agents from entering the cavity and damaging the sensor or its wiring. The cavity can also be filled with a low durometer elastomeric potting material, silicon oil, or any other suitable material for protection of the components from environmental agents such as water. The choice of the elastomeric potting material can be selected according to the anticipated environmental exposure of the sensor. For example, a low out-gassing material may be appropriate if the sensor is used at high altitude or space while a low compression material may be better if the sensor is used below sea level, such as underwater or underground.

An excitation coil is wound around the poles on one of the magnetic cores, and provides electrical connection for an inductance whose value is variable as a function of the widths of the gaps, and also the axial distortion of the support tube. In the preferred embodiment, there are two excitation coils, each surrounding a separate end of the C-shaped core. This arrangement minimizes non-linearity of response due to fringing effects. The wires from the two coils are twisted and attached to cabling that connects them to external circuitry. Thus, when excited by an external AC voltage, the C-core, the I-core and the gap between the C and I cores form an element of a magnetic circuit. The reluctance of this element is dominated by the gap because the C and I cores are fabricated from high permeability magnetic materials having very little reluctance. The sensor inductance is coupled with a fixed, predetermined capacitance in a resonant inductance-capacitance (LC) circuit. The resonant frequency of the LC circuit is a function of the gap between the C-shaped and I-shaped cores. Accordingly, changes in the gap dimension results in a change in oscillation frequency. Since the only active component in the sensor is the number of excitation coils, the sensor is immune to drift.

To measure the load on a static device, for example, a chain that moors a marine platform, the support tube is fixedly attached to the surface of a sensor link, and the sensor link placed as a link in the chain. The support tube can be attached to the surface of the sensor link using bolts, by welding, or any other suitable attaching means. In order for the sensor to measure the load on the sensor link, it is preferred that the sensor tube material and the sensor link material are compatible, more preferably the same material or material having the same or similar coefficient of thermal expansion. In the preferred embodiment, the support tube and the sensor link are made of steel. When used in marine applications, it is preferred that a protective coating is applied to the support tube and the sensor link.

These and other features and advantages of this invention are described in or are apparent from the following detailed description of the preferred embodiments.

BRIEF DESCRIPTION OF THE DRAWINGS

The preferred embodiments of the present invention will be described in detail, with reference to the following figures, wherein:

FIG. 1 is a top view of a variable reluctance sensor assembly having a variable reluctance sensor in a support tube attached to a sensor link;

FIG. 2 is a close-up top-view of the variable reluctance sensor;

FIG. 3 is a side view of the variable reluctance sensor assembly; and

FIG. 4 is close-up side view of the variable reluctance sensor.

Throughout the drawing figures, like reference numerals will be understood to refer to like parts and components.

DESCRIPTION OF THE PREFERRED EMBODIMENT

FIG. 1 is a top view of a variable reluctance sensor assembly 10 having a variable reluctance sensor 12 in a support tube 14 attached to a sensor link 16. FIG. 2 is a close-up top-view of the variable reluctance sensor 12. FIG. 3 is a side view of the variable reluctance sensor assembly 10, and FIG. 4 is a close-up side view of the variable reluctance sensor 12.

The sensor 12 in accordance with the present invention uses an opposing C-shaped magnetically permeable core 18 and an I-shaped magnetically permeable core 20 contained in the support tube 14. This forms a magnetic circuit having an inductance defined by the size of the gaps 22, 24 between the magnetic cores 18, 20.

The C-shaped core 18 is mounted on a first mounting plate 26 by a first bracket 28. Likewise, the I-shaped core is mounted on a second mounting plate 30 by a second bracket 32. The first mounting plate 26 is preferably positioned transverse to the longitudinal axis of the support tube 14. Similarly, the second mounting plate 30 is also preferably positioned transverse to the longitudinal axis of the support tube 14. As the support tube 14 expands along its longitudinal axis, the first and second end plates 26, 30 separate. Since the C-shaped core 18 and the I-shaped core 20 are attached to their respective mounting plates 26, 30, the size of the gap 22, 24 will be lengthened. This alters the inductance between the C-shaped core 18 and the I-shaped core 20, and is indicative of the amount of expansion that has occurred, and the force needed to cause the expansion. Likewise, as the support tube 14 contracts along its longitudinal axis, the first and second end plates 26, 30 move towards each other, resulting in the shortening of the gap 22, 24. This alters the inductance between the C-shaped core 18 and the I-shaped core 20, and is indicative of the reduction in the force applied to the sensor link 16.

Mounted around each end of the C-shaped core 18 is a first excitation coil 34 and a second excitation coil 36. The two excitation coils 34, 36 are connected in series at coil wires 38, and subsequently attached to cabling 40. The excitation coils 34, 36 provide electrical connection for an inductance whose value is variable as a function of the widths of the gaps 22, 24, and also the axial distortion of the support tube 14. This arrangement minimizes non-linearity of response due to fringing effects. The coils 34, 36 are preferably encapsulated in a non-conductive material, for example, polyurethane.

When excited by an external AC voltage, the C-core 18, the I-core 20 and the gaps 22, 24 between the C and I cores 18, 20 form an element of a magnetic circuit. The reluctance of this element is dominated by the gaps 22, 24 because the C and I cores are fabricated from high permeability magnetic materials having very little reluctance. The sensor inductance is coupled with a fixed, predetermined capacitance in a resonant inductance-capacitance (LC) circuit, not shown. Many different LC circuits are known in the art, and the actual layout can vary. Accordingly, LC circuit design need not be discussed further. The resonant frequency of the LC circuit is a function of the gap between the C-shaped and I-shaped cores. Accordingly, changes in the gap dimension results in a change in oscillation frequency. Since the only active component in the sensor is the number of excitation coils, the sensor is immune to drift.

Cabling 40 can be any electrically conductive wires, and is preferably low capacitance twisted pair whose dielectric constant varies little with temperature. Cabling 40 connects the sensor 12 to a connector 42. The connector 42 can be any suitable electrical connector. In this invention, when used near or under water, connector 42 is preferably an underwater mateable connector. The connector 42 allows the cabling 40 to be connected to external electrical circuitry that supplies electricity as well as connecting the sensor to a resonant LC circuit, not shown.

In the preferred embodiment, mounting plates 26, 30, in conjunction with the support tube 14, forms a sensor cavity 44. The sensor 12 is enclosed in a protective cavity that can be sealed, to provide additional protection against water, marine growth or other agents from damaging the sensor 12 and its cabling 40. In the preferred embodiment, the sensor cavity 44 is filled with a low durometer elastomeric potting material that encapsulates the sensor 12 and its wiring. The potting material can be any of a number of known potting materials, for example, solithanes and room temperature vulcanizing silicones, commonly referred to as RTV. Alternatively, the sensor cavity 44 can be filled with an oil, preferably a silicon oil. Additionally, the external surface 46 of the sensor cavity 44 can be covered with an elastomeric boot and shroud, not shown, forming a rugged sheath around the sensor cavity 44 to protect the sensor 12 and its components from damage caused by dropped or sharp objects impacting the support tube 14 or the, sensor cavity 44.

The support tube 14 contains the sensor 12, and is used to mount the sensor 12 to the sensor link 16. Having a support tube 14 longer than the sensor 14 increases the gauge length of the sensor assembly 10, providing additional displacement and increasing the accuracy of the device. The connector 42 is mounted on the support tube 14, and allows for connection of the sensor 12 to the external LC circuit.

The support tube 14 is fixedly attached to the surface 48 of a sensor link 16. The support tube 14 can be attached to the surface 48 of the sensor link 16 using bolts, by welding, or any other suitable attaching means. In order for the sensor 12 to accurately measure the load on the sensor link 16, it is preferred that the support tube material and the sensor link material are compatible. More preferably the support tube material and the sensor link material should be the same material or material having the same or similar coefficient of thermal expansion. In the preferred embodiment, the support tube 14 and the sensor link 16 are made of steel. When used in marine applications, it is preferred that a protective coating is applied to the support tube and the sensor link.

The primary purpose of the support tube 14 is to increase the gauge length of the assembly and thereby provide additional displacement to increase the accuracy of the device.

When assembled, the variable reluctance sensor assembly 10 can measure steady state and slowly fluctuating loads in the range from DC to 10 Hz. This device is capable of measuring displacements to as low as 0.0001 inches. Multiplying the displacement by the stiffness of the link yields the load measurement capability. The amount of measured displacement is dependent upon the area of the poles and the opposing area of the I-core, and can range from $10^{-4}$ and larger, including inches and feet.

The device is particularly appropriate for measuring loads on deployed structures that require long term monitoring and do not provide access to the sensor for maintenance or replacement. Applications include building monitoring, bridge monitoring, tower monitoring, marine moorings monitoring, and weighing hoppers of a vehicle. Marine moorings monitoring includes large marine platforms such as spars, or a buoy that floats vertically in the water and moored to the seabed by anchors, as well as floating production, storage and offloading vessels and semi-submersibles and submersibles.

Another embodiment is to mount at least 3 sensors away from the axis in a single housing or in multiple housings and to use the displacements measured by these sensors to define a plane whose equation specifies both the displacement along the longitudinal axis and the rotation thus separately defining the axial tension or compression and the bending load.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method of determining a strain on a link comprising:
  providing a sensor including:
    a link, said link constructed of a first material, said link having a link longitudinal axis,
    a tube having a tube-longitudinal axis and attached to a surface on the link such that said link longitudinal axis and said tube longitudinal axis are approximately parallel,
    first and second members, said first and second members extending transversely across an interior portion of the tube at different locations and forming a sensor cavity within the tube,
    a first magnetically permeable core attached to said first member and extending transversely to said tube longitudinal axis and providing a pair of first spaced pole ends, each first pole end having a first spaced face,
    a second magnetically permeable core attached to said second member and extending transversely to said tube-longitudinal axis and providing a pair of second spaced pole ends, each second pole end having a second spaced face, each said second spaced face opposing its corresponding each said first spaced face and separated by a magnetic gap width,
    a first excitation coil wound around one of the first pole ends and a second excitation coil wound around the other first pole end using conductive wire, one end of the wire from each of the first and second excitation coils being conductively connected and the other end forming an excitation coil pair,
    said excitation coil pair connected to a cable extending through the tube, connectable to a supply voltage and predetermined capacitance in a resonant inductance-capacitance circuit, providing connection to an inductance which is variable as a function of the magnetic gap width and also as a function of relative displacement of said first and second members resulting from strain on the link along the link longitudinal axis; and
  measuring the inductance to determine a strain on the link.

2. A method of measuring a load comprising:
  providing a load measurement device including:
    a link, said link constructed of a first material having a link longitudinal axis,
    a hollow structure fixedly attached to said link along the link longitudinal axis, said hollow structure constructed of a second material having substantially repeatable elastic properties, said structure having a longitudinal axis,
    first and second members, said first and second members extending transversely across an interior portion of the hollow structure at different locations and forming a cavity within the structure,
    a first magnetically permeable core attached to said first member and extending transversely to said longitudinal axis and providing a pair of first spaced pole ends, each first pole end having a first spaced face, said first spaced faces substantially perpendicular to the longitudinal axis,
    a second magnetically permeable core attached to said second member and extending transversely to said longitudinal axis and providing a pair of second spaced pole ends, each second spaced pole end having a second spaced face, each of said second spaced faces substantially perpendicular to the longitudinal axis and opposing corresponding first spaced faces and separated by a magnetic gap width, a first excitation coil wound around one of the first spaced pole ends and a second excitation coil wound around the other first spaced pole end using conductive wire, one end of the wire from each of the first and second excitation coils forming an excitation coil pair, and an electrical connector mounted on the hollow structure, an inside portion of the connector facing the cavity within the hollow structure, said excitation coil pair electrically connected to the inside portion of the electrical connector, an outer portion of the connector connectable to an external voltage source and predetermined capacitance in a resonant inductance-capacitance circuit, providing connection to an inductance which is variable as a function of the gap width and also as a function of relative displacement of said first and second members resulting from strain on the cylinder along the longitudinal axis; and determining the inductance to measure the load.

3. A method of determining a load, comprising:

providing a load cell for measuring the load on a link constructed of a first material and having a link longitudinal axis, said load cell including a tube having a tube-longitudinal axis and attached to a surface on said link such that said link longitudinal axis and said tube longitudinal axis are approximately parallel, first and second members, said first and second members extending transversely across an interior portion of said tube at different locations and forming a sensor cavity within said tube, a first magnetically permeable core attached to said first member and extending transversely to said tube longitudinal axis and providing a pair of first spaced pole ends, each first pole end having a first spaced face, a second magnetically permeable core attached to said second member and extending transversely to said tube-longitudinal axis and providing a pair of second spaced pole ends, each second pole end having a second spaced face, each said second spaced face opposing its corresponding each said first spaced face and separated by a magnetic gap width, a first excitation coil wound around one of said pair of first pole ends and a second excitation coil wound around the other of said pair of first pole ends using conductive wire, one end of said wire said first excitation coil and said second excitation coil being conductively connected and the other end forming an excitation coil pair, said excitation coil pair connected to a cable extending through said tube, connectable to a supply voltage and predetermined capacitance in a resonant inductance-capacitance circuit, providing connection to an inductance which is variable as a function of said magnetic gap width and also as a function of relative displacement of said first and second members resulting from strain on said link along said link longitudinal axis; and determining inductance to measure the load on the link.

* * * * *